(12) United States Patent
Cunningham et al.

(10) Patent No.: US 8,326,157 B2
(45) Date of Patent: Dec. 4, 2012

(54) HIGH-SPEED OPTICAL TRANSCEIVER, A BI-DIRECTIONAL DUPLEX OPTICAL FIBER LINK, AND A METHOD FOR PROVIDING A BI-DIRECTIONAL DUPLEX OPTICAL FIBER LINK

(75) Inventors: David G. Cunningham, Woodbridge (GB); Ian H. White, Madingley (GB); Jonathan D. Ingham, Cambridge (GB)

(73) Assignee: Cambridge Enterprise Limited (GB)

( * ) Notice: Subject to any disclaimer, the term of this patent is extended or adjusted under 35 U.S.C. 154(b) by 441 days.

(21) Appl. No.: 12/495,707

(22) Filed: Jun. 30, 2009

(65) Prior Publication Data

US 2010/0329669 A1   Dec. 30, 2010

(51) Int. Cl.
*H04B 10/00* (2006.01)

(52) U.S. Cl. .................... 398/135; 398/142; 398/143

(58) Field of Classification Search ............. 398/41–42, 398/141–145, 135
See application file for complete search history.

(56) References Cited

U.S. PATENT DOCUMENTS

| | | | |
|---|---|---|---|
| 6,243,508 | B1 | 6/2001 | Jewell et al. |
| 6,609,834 | B2 | 8/2003 | Cunningham et al. |
| 7,228,032 | B2 | 6/2007 | Blauvelt et al. |
| 7,359,592 | B2 | 4/2008 | Truong |
| 7,502,533 | B2 | 3/2009 | Kirkpatrick et al. |
| 2005/0019036 | A1* | 1/2005 | Soto et al. ................ 398/135 |
| 2005/0213983 | A1* | 9/2005 | Shie et al. ................ 398/135 |
| 2009/0074351 | A1* | 3/2009 | Chung et al. ............... 385/14 |
| 2009/0154935 | A1* | 6/2009 | Deliwala .................. 398/139 |
| 2009/0214769 | A1* | 8/2009 | DiGiovanni et al. ...... 427/163.2 |
| 2009/0310915 | A1* | 12/2009 | Jewell et al. .............. 385/33 |

OTHER PUBLICATIONS

L. Raddatz, I.H. White, D.G. Cunningham, & M.C. Nowell, Influence of Restricted Mode Excitation on Bandwidth of Multimode Fiber Links; IEEE Photonics Technology Letters, Apr. 1998, pp. 534-536, vol. 10, No. 4, IEEE.

J.R. Kroff, N. Ledentsov, J. Lott & H. Quast, 40Gbit/s Transmission over OM3 Duplex Fiber presentation; IEEE 802.3ba Task Force, Jul. 2008, VI Systems GmbH, 90 pages, Denver CO.

\* cited by examiner

*Primary Examiner* — Dzung Tran (57) ABSTRACT

A duplex optical fiber link is provided that includes two bi-directional optical fiber links. Each of the bi-directional links includes a multimode optical fiber and an optical transceiver connected to each of the ends of each of the fibers. Each of the optical transceivers includes a bi-directional optical multiplexer (MUX) that is configured to simultaneously optically couple optical data signals produced by a laser diode of the transceiver into an end of one of the fibers and to optically couple an optical data signal passing out of the end of one of the fibers onto a photodiode of the transceiver. The laser diodes operate at a data rate of at least 10 Gb/s such that each optical transceiver transmits and receives optical data signals at an aggregate data rate of at least 20 Gb/s. Consequently, the bi-directional duplex optical link has an aggregate data rate of at least 40 Gb/s.

36 Claims, 5 Drawing Sheets

HIGH-SPEED OPTICAL TRANSCEIVER, A BI-DIRECTIONAL DUPLEX OPTICAL FIBER LINK, AND A METHOD FOR PROVIDING A BI-DIRECTIONAL DUPLEX OPTICAL FIBER LINK

TECHNICAL FIELD OF THE INVENTION

The invention relates to optical communications networks over which data is communicated in the form of optical signals transmitted and received over optical waveguides. More particularly, the invention relates to a high-speed optical transceiver and method for using the optical transceiver to achieve a high-speed duplex optical fiber link over which optical data signals are bi-directionally communicated at high speeds.

BACKGROUND OF THE INVENTION

In optical communications networks, optical transceivers are used to transmit and receive optical signals over optical fibers. An optical transceiver generates amplitude and/or phase and/or polarization modulated optical signals that represent data, which are then transmitted over an optical fiber coupled to the transceiver. Each transceiver includes a transmitter side and a receiver side. On the transmitter side, a laser light source generates laser light and an optical coupling system receives the laser light and optically couples, or images, the light onto an end of an optical fiber. The laser light source typically is made up of one or more laser diodes that generate light of a particular wavelength or wavelength range. The optical coupling system typically includes one or more reflective elements, one or more refractive elements and/or one or more diffractive elements. On the receiver side, a photodiode detects an optical data signal transmitted over an optical fiber and converts the optical data signal into an electrical signal, which is then amplified and processed by electrical circuitry of the receiver side to recover the data. The combination of the optical transceivers connected on each end of the optical fiber and the optical fiber itself is commonly referred to as an optical fiber link.

In high-speed optical fiber links (e.g., 10 Gigabits per second (Gb/s) and higher), multimode optical fibers are often used to carry the optical data signals. In such links, certain link performance characteristics, such as the link transmission distance, for example, are dependent in part on the design of the optical coupling system, the modal bandwidth of the fiber, and the relative intensity noise (RIN) of the laser diode. The modal bandwidth of the fiber and the RIN of the laser diode can be affected by the launch conditions of the laser light into the end of the multimode optical fiber. The launch conditions are, in turn, dependent upon the properties of the laser diode itself and upon the design and configuration of the optical coupling system. Due to limitations on the manufacturability of optical elements that are typically used in optical coupling systems, the ability to control the launch conditions is limited primarily to designing and configuring the optical coupling system to control the manner in which it images the light from the laser diode onto the end of the fiber.

Due to the nature of the processes that are used to manufacture multimode fibers, center and edge defects often exist in the refractive index profiles of the fibers. The existence of the defects can dramatically change the effective modal bandwidth of the fiber and degrade it below the out-of-factory minimum specification. For these reasons, efforts are often made to control the launch conditions of the laser diode to prevent the laser light from passing through the areas in the fiber where the defects are most severe and where the occurrence of the defects is more frequent. For example, in spiral launch optical coupling systems, the laser light is encoded with a phase pattern that rotates the phase of the light linearly around the optical axis of a collimating lens that is used to couple the light onto the end of the optical fiber. Rotating the phase of the laser light about the optical axis helps to ensure that refractive index defects in the center of the fiber are avoided. In addition, the spiral launch methodology is relatively successful at reducing optical feedback from the fiber end to the laser aperture, which can destabilize the laser.

While various transceiver and optical fiber link designs enable the overall bandwidth, or data rate, of optical fiber links to be increased, there are limitations on the extent to which currently available technologies can be used to improve the bandwidth of an optical fiber link. For example, there is currently a need for multimode optical fiber links that operate at data rates that are well in excess of the data rates at which currently available laser diodes are capable of operating. In particular, a class of multimode optical fibers commonly referred to as OM3 multimode optical fibers are optimized for use with vertical cavity surface emitting laser diodes (VCSELs) that operate near a wavelength of 840 nanometers (nm). Currently, however, no commercially available VCSELs operate at speeds greater than around 10 Gb/s.

It has been shown that receiver-based electronic dispersion compensation (EDC) techniques in combination with particular modulation formats can be used to provide optical fiber links that operate at speeds that are higher than the speeds at which the VCSELs of the link transceivers operate. Such links, however, are generally limited to data rates of about 20 Gb/s.

It is also known that multiple optical links can be combined to achieve an optical link having a higher data rate than that of each of the individual optical links that form the combination. For example, it is known to combine four 10 Gb/s optical links to achieve an optical link having an overall bandwidth of 40 Gb/s optical links. However, in order to achieve such a link, four sets of parallel optics and four optical fibers are needed, which significantly adds to the costs associated with such links. The number of sets of parallel optics and optical fibers that would be needed to form such a link could be reduced by using different wavelengths for the optical signals that are being transmitted and received. Using different wavelengths for the optical signals being transmitted and received, however, would require the use of laser diodes that transmit light at different wavelengths, which can increase the costs associated with the optical link. In addition, using different wavelengths over the same optical paths would require the use of wavelength division multiplexing (WDM) to separate the optical data signals.

A need exists for a bi-directional optical link that uses a single multimode optical fiber and a single wavelength and that is capable of operating at data rates that are in excess of 20 Gb/s. A need also exists for a bi-directional duplex optical link that is capable of operating at data rates in excess of 40 Gb/s and which does not require a set of parallel optics and fibers for each optical path.

SUMMARY OF THE INVENTION

The invention is directed to an optical transceiver for use in a bi-directional duplex optical link, to a bi-directional duplex optical link, and to a method for communicating optical data signals over a bi-directional duplex optical link. The optical transceiver comprises at least a first laser driver circuit, a first laser diode, a first bi-directional optical multiplexer (MUX), a first photodiode, and a first amplifier. The first laser driver circuit is configured to receive a first electrical data signal and to produce a first electrical drive signal. The first laser diode is configured to receive the first electrical drive signal produced by the first laser driver circuit and to produce at least a first optical data signal having a first data rate. The bi-directional optical MUX is configured to receive the first optical data signal and to launch the first optical data signal into a first end of a first multimode (MM) optical fiber with an offset. The bi-directional optical MUX directs the first received optical data signal onto the first photodiode. The first received optical data signal has the first data rate. The first photodiode is configured to convert the first received optical data signal into a first received electrical data signal. The first amplifier is configured to amplify the first received electrical data signal to produce a first amplified received electrical data signal.

The bi-directional duplex optical link comprises at least first and second MM optical fibers, at least first, second, third, and fourth optical transceivers connected to the ends of the MM optical fibers. Each optical transceiver comprises an optical transmitter (TX) comprising at least a laser driver circuit and a laser diode, an optical receiver (RX) comprising at least a photodiode and an amplifier, and a bi-directional optical MUX. The laser driver circuit is configured to receive an electrical data signal and to produce an electrical drive signal based on the electrical data signal. The laser diode is configured to receive the electrical drive signal and to produce a TX optical data signal having a first data rate. The photodiode of the optical RX is configured to receive an RX optical data signal and to produce a corresponding RX electrical data signal based on the RX optical data signal. The RX optical data signal has the first data rate. The amplifier is configured to amplify the RX electrical data signal to produce an amplified RX electrical data signal. The bi-directional optical MUX is configured to optically couple at least a portion of the TX optical data signal into the first end of one of the first and second MM optical fibers and to optically couple at least a portion of the RX optical data signal passing out of the first end of one of the first and second MM optical fibers onto the photodiode. The optically coupling of the TX optical data signal into the first end of one of the first and second MM optical fibers by the bi-directional optical MUX is performed with an offset launch.

The method comprises providing at least first and second MM optical fibers, and providing at least first, second, third, and fourth optical transceivers. The first and second optical transceivers are connected to the first and second ends of the first MM optical fiber, respectively. The third and fourth optical transceivers are connected to the first and second ends of the second MM optical fiber, respectively. The method further comprises: in each optical transceiver, receiving a respective electrical data signal in a respective optical TX of the respective optical transceiver, in a respective laser driver circuit of the respective optical TX, receiving the respective electrical data signal and producing a respective electrical drive signal; in each respective laser diode, receiving the respective electrical drive signal and producing a respective TX optical data signal having a first data rate; in a respective bi-directional optical MUX of the respective optical transceiver, optically coupling at least a portion of the respective TX optical data signal into the first end of one of the first and second MM optical fibers with an offset launch; in the respective bi-directional optical MUX of the respective optical transceiver, optically coupling at least a portion of a received (RX) optical data signal having the first data rate passing out of the first end of one of the first and second MM optical fibers onto a respective photodiode of a respective optical receiver RX of the respective optical TX, which converts the respective RX optical data signal into a corresponding RX electrical data signal; and, in a respective amplifier of the respective optical RX of the respective optical transceiver, amplifying the respective RX electrical data signal to produce a respective amplified RX electrical data signal.

These and other features and advantages of the invention will become apparent from the following description, drawings and claims.

DETAILED DESCRIPTION OF AN ILLUSTRATIVE EMBODIMENT

In accordance with the invention, a duplex optical fiber link is provided that includes two bi-directional optical fiber links. Each of the bi-directional links includes a multimode optical fiber and an optical transceiver connected to each of the ends of each of the fibers. Each of the optical transceivers includes a bi-directional optical multiplexer (MUX) that is configured to simultaneously optically couple optical data signals produced by a laser diode of the transceiver into an end of one of the fibers and to optically couple an optical data signal passing out of the end of one of the fibers onto a photodiode of the transceiver. The laser diodes operate at a frequency of at least 10 Gb/s such that each optical transceiver transmits and receives optical data signals at an aggregate data rate of at least 20 Gb/s. Consequently, the bi-directional duplex optical link that uses two multimode optical fibers has an aggregate data rate of at least 40 Gb/s.

The term "data rate" is used herein to denote the speed at which the optical transceivers or the components thereof (e.g., the laser diodes) operate, and to denote the speed at which the optical links operate. The term "aggregate data rate" is used herein to denote the sum of the data rates of optical data signals being simultaneously carried in each direction on an optical link.

Figure 1:
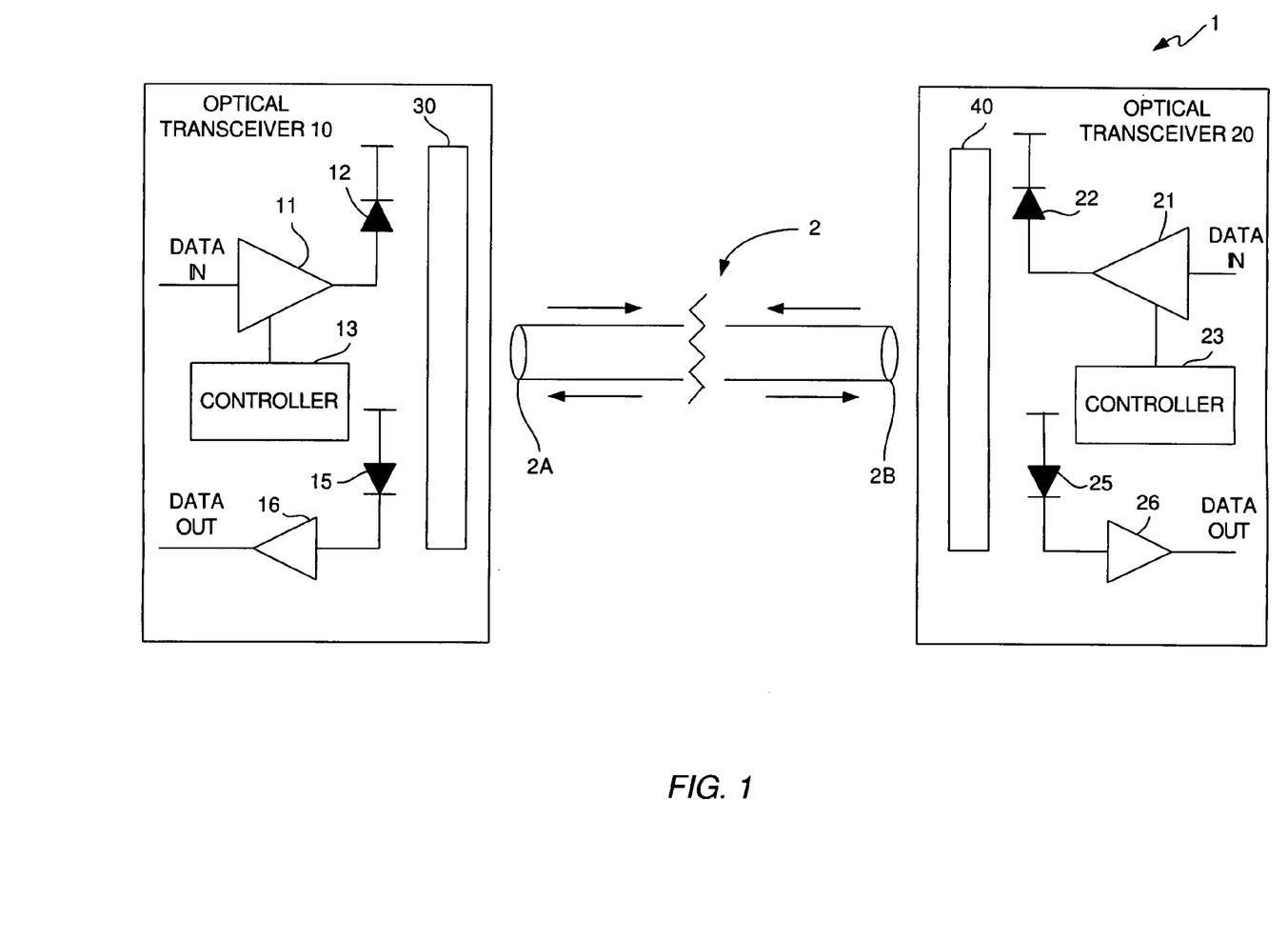
FIG. 1 illustrates a block diagram of one of the two bi-directional optical fiber links of the bi-directional duplex optical fiber link of the invention in accordance with an embodiment.

FIG. 1 illustrates a block diagram of one of the two bi-directional optical fiber links of the bi-directional duplex optical fiber link in accordance with an embodiment. The bi-directional optical fiber link 1 shown in FIG. 1 includes a multimode (MM) optical fiber 2, a first optical transceiver 10 connected to a first end of the optical fiber 2, and a second optical transceiver 20 connected to a second end of the MM optical fiber 2. In accordance with this illustrative embodiment, the optical transceivers 10 and 20 have identical configurations. It should be noted, however, that it is not necessary for the transceivers 10 and 20 to have identical configurations, as will be understood by persons of ordinary skill in the art in view of the descriptions being provided herein.

On the transmit side of the optical transceivers 10 and 20, laser driver circuits 11 and 21 of the transceivers 10 and 20, respectively, receive electrical data signals, which are labeled "Data In" in FIG. 1. The output terminals of the laser driver circuits 11 and 21 are connected to input terminals of VCSELs 12 and 22, respectively. The laser driver circuits 11 and 21 produce respective laser driver signals that modulate the respective VCSELs 12 and 22, causing the VCSELs 12 and 22 to produce respective optical data signals. Controllers 13 and 23 of the optical transceivers 10 and 20, respectively, send control signals to the laser driver circuits 11 and 21, respectively, to cause the laser driver circuits 11 and 21 to adjust, if necessary, the modulation and/or bias currents of the respective VCSELs 12 and 22. The respective optical data signals that are produced by the VCSELs 12 and 22 are launched by optical coupling systems 30 and 40, respectively, into respective ends 2A and 2B of the MM optical fiber 2.

On the receive sides of the optical transceivers 10 and 20, the optical coupling systems 30 and 40 receive respective optical data signals passing out of the ends 2A and 2B, respectively, of the optical fiber 2 and couple the respective optical data signals onto respective photodiodes 15 and 25 of the transceivers 10 and 20. The respective photodiodes 15 and 25 convert the respective optical data signals into respective electrical data signals and output the respective electrical data signals to respective amplifiers 16 and 26 of the transceivers 10 and 20. The amplifiers 16 and 26 are high-speed amplifiers such as, for example, transimpedance amplifiers (TIAs), which detect the electrical data signals to recover the bits contained in the data signals. The receive sides of the optical transceivers 10 and 20 typically include additional electrical circuitry, such as filters and buffers (not shown), for example, for further processing of the electrical signals produced by the photodiodes 15 and 25. For ease of illustration and in the interest of brevity, this additional electrical circuitry on the receiver sides is not shown in FIG. 1. Similarly, the transmit sides of the optical transceivers 10 and 20 typically also include additional electrical circuitry, such as, for example, buffers and other circuitry (not shown) in front of the laser driver circuits 11 and 21 for conditioning the input data signal. The transmit sides typically also include monitoring and feedback circuitry (not shown) for monitoring the output power levels of the laser diodes 12 and 22 and for causing the controllers 13 and 23 to adjust the modulation and/or bias currents of the laser diodes 12 and 22 in a manner that causes the average optical output power of the laser diodes 12 and 22 to be maintained at substantially constant levels. For ease of illustration and in the interest of brevity, this additional electrical circuitry also is not shown in FIG. 1.

In accordance with this illustrative embodiment, the VCSELs 12 and 22 of the first and second optical transceivers 10 and 20, respectively, use the same wavelength to transmit and receive optical data signals over the MM optical fiber 2. By using the same wavelength to transmit and receive optical data signals over the MM optical fiber 2, the need to perform WDM on the transmit (TX) and receive (RX) channels of each of the optical transceivers 10 and 20 is avoided. In addition, because the same wavelength is used to transmit and receive optical data signals over the MM fiber 2, the need to manufacture laser diodes that produce different wavelengths of light, which is generally very expensive, is avoided. However, in order for it to be possible to use the same wavelength to bi-directionally transmit and receive data over the single MM optical fiber 2, it is necessary for the link 1 to be configured in a manner that prevents, or at least reduces, near-end and far-end optical coupling between the VCSELs 12 and 22. The term "far-end optical coupling", as that term is used herein, refers to laser light output through the aperture of the VCSEL at the far end of the link 1 being coupled into the aperture of the VCSEL located at the far end of the link. For example, far-end optical coupling relative to the optical transceiver 10 refers to laser light produced by the VCSEL 22 being coupled into the aperture of VCSEL 12. The term "near-end optical coupling", as that term is used herein, refers to the laser light produced by the VCSEL at near end of the link 1 being coupled back into the aperture of the same VCSEL. For example, near-end optical coupling relative to the optical transceiver 10 refers to laser light produced by VCSEL 12 being coupled back into the aperture of VCSEL 12.

In accordance with embodiments of the invention, near-end and far-end optical coupling between the VCSELs 12 and 22 is prevented or at least substantially reduced by configuring the optical coupling systems 30 and 40 to perform an offset launch method. Use of the offset launch method prevents or at least substantially reduces near-end and far-end optical coupling between the VCSELs 12 and 22. It should be noted that although each of the optical coupling systems 30 and 40 is depicted in FIG. 1 as performing the optical coupling tasks for both the transmit and receive sides, separate optical coupling systems may be used for the transmit and receive sides, as will be understood by persons of ordinary skill in the art in view of the description being provided herein.

A variety of offset launch methods and offset launch configurations for the optical coupling systems 30 and 40 are suitable for use with the invention. The invention is not limited with respect to the particular offset launch method and/or optical coupling system configuration that are used for this purpose. The manufacturer of the optical transceivers 10 and 20 will construct the transceivers 10 and 20 to implement the desired offset launch method and configuration of the optical coupling systems 30, 40. Use of an offset launch method causes the laser light that is launched from the near-end VCSEL 12, 22 into the end 2A, 2B of the MM optical fiber 2 to excite a plurality of modes of the MM fiber 2 that are higher order modes than the modes of the near-end VCSEL 12, 22. This ensures that the light from the near end VCSEL 12, 22 is spread into a plurality of modes. At the far end of the link 1, the spot size of the laser light that passes out of the far end of the MM optical fiber 2 is larger than the aperture of the far-end VCSEL. This ensures that very little, if any, laser light that passes out of the far end of the MM optical fiber 2 will be optically coupled into the aperture of the far-end VCSEL.

Likewise, the aperture of the near-end VCSEL is smaller than the spot size of the laser light that passes out of the near end of the fiber 2, which ensures that very little, if any, of the laser light that passes out of the near end of the MM optical fiber 2 will be optically coupled into the aperture of the near-end VCSEL. In addition, because the modes of the MM optical fiber 2 are higher than the modes of the VCSELs 12, 22, any mode overlap between the VCSEL modes and fiber modes will be very small or nonexistent. The combination of the spot size of the laser light output from the ends of the fiber 2 being larger than the apertures of the VCSELs 12, 22 and the small or nonexistent overlap between the VCSEL modes and the fiber modes ensures that there will be very little, if any, near-end and far-end optical coupling between the VCSELs 12 and 22.

Figure 2:
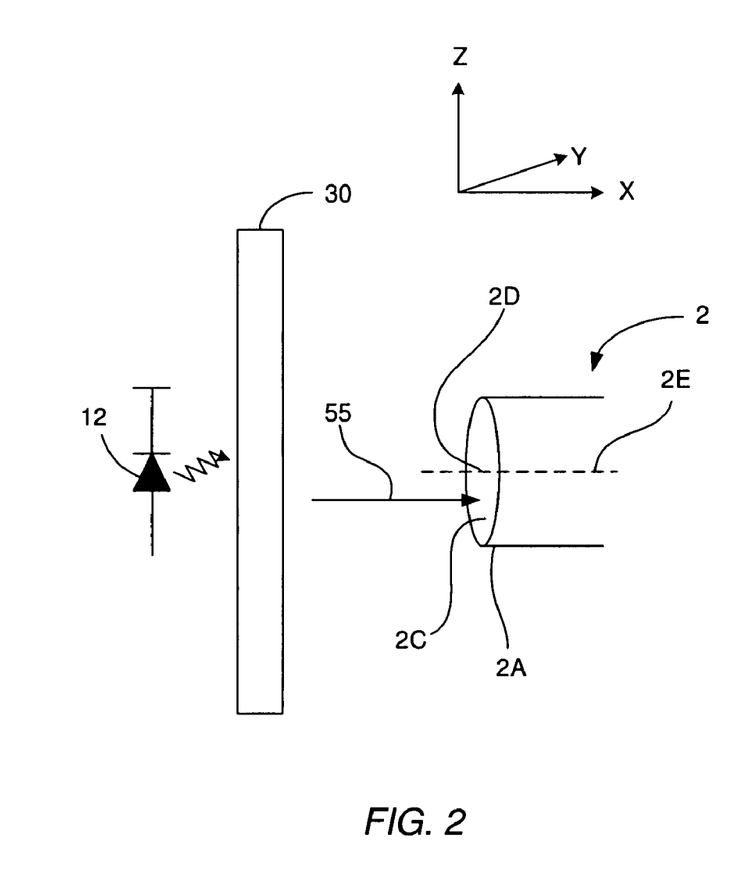
FIGS. 2 and 3 are perspective plan views that depict different offset launch methods that may be used in the optical transceivers of the optical link shown in FIG. 1.
Figure 3:
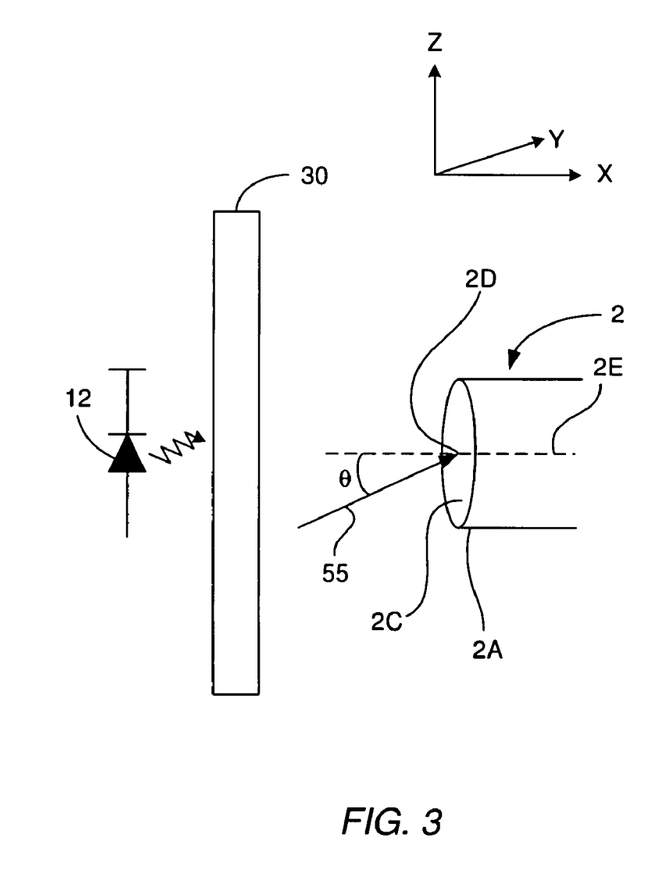

FIGS. 2 and 3 are perspective plan views that depict different offset launch methods that may be used in the optical transceivers of the optical link 1 shown in FIG. 1. As indicated above, there are a variety of offset launch methods and configurations for the optical coupling systems 30 and 40 that may be used to provide an offset launch that excites the higher order fiber modes in the MM optical fiber 2. It is believed that a purely center launch (i.e., a non-offset launch) will excite only the lowest order mode group in the MM optical fiber 2. Therefore, a purely center launch, or any other type of launch that predominantly excites only the lowest order mode group in the MM optical fiber 2, should be avoided.

FIG. 2 illustrates the end 2A of the fiber 2 and the optical coupling system 30 shown in FIG. 1 in accordance with an embodiment in which an offset launch causes the laser light output from the VCSEL 12 to enter the end 2A of the MM fiber 2 at a location that is offset from the center of the fiber 2. Reference numeral 2C refers to the end face of the fiber 2. Reference numeral 2D refers to the center of the fiber end face 2C of the fiber 2. The center 2D of the fiber end face 2C corresponds to a location at which a longitudinal axis 2E of the fiber 2 (the X-dimension) intersects the fiber end face 2C. Laser light that is produced by the VCSEL 12 is optically processed by the optical coupling system 30 into a collimated light beam 55, which the optical coupling system 30 causes to be directed onto the fiber end face 2C. In accordance with this embodiment, the light beam is parallel or substantially parallel to the longitudinal axis 2E of the fiber 2, but is offset in the Z dimension and/or in the Y dimension from the center 2D of the fiber end face 2C. This offset in the Z and/or Y dimensions will be referred to hereinafter as a physical offset. This physical offset will cause a plurality of higher order modes to be excited in the MM optical fiber 2, leading to the desired effect of preventing near-end and far-end optical coupling between the VCSELs 12 and 22.

In FIG. 3, the light beam 55 is directed by the optical coupling system 30 onto the end face 2C of the fiber 2 such that the light beam 55 intersects the center 2D of the end face 2C at an angle, $\theta$, to the longitudinal axis 2E of the MM optical fiber 2. This offset at an angle to the longitudinal axis 2E of the MM optical fiber 2 will be referred to hereinafter as an angular offset. This angular offset will cause a plurality of higher order modes to be excited in the MM optical fiber 2, leading to the desired effect of preventing or lessening near-end and far-end optical coupling between the VCSELs 12 and 22.

The offset launch methods described above with reference to FIGS. 2 and 3 may be combined to provide a physical and angular offset launch. For example, the angular offset launch described above in which the light beam 55 intersects the center 2D may be modified such that the light beam 55 intersects the fiber end face 2C at the same angle, $\theta$, to the longitudinal axis 2E of the MM optical fiber 2 shown in FIG. 3, but with the location of the intersection physically offset in the Z and/or Y dimensions such that it does not intersect the center 2D of the fiber end face 2C, as shown in FIG. 2. The physical and angular offset launch will cause a plurality of higher order modes to be excited in the MM optical fiber 2, leading to the desired effect of preventing near-end and far-end optical coupling between the VCSELs 12 and 22.

A variety of configurations of the optical coupling systems 30 and 40 may be used to achieve the physical and/or angular offsets described above with reference to FIGS. 2 and 3. For example, one or more typical refractive elements (e.g., lenses) and/or reflective elements may be used to provide the physical and/or angular offsets. In the interest of brevity, a detailed discussion of configurations that may be used for this purpose will not be provided herein since persons of ordinary skill in the art will understand, in view of the description provided herein, the manner in which suitable configurations for the optical coupling systems 30 and 40 can be achieved.

In addition to the offset launch methods described above, a variety of other offset launch methods and optical coupling systems configurations may be used. For example, a spiral launch method and configuration may be implemented in the optical coupling systems 30 and 40 by using one or more diffractive elements in the systems 30 and 40. The diffractive element may be, for example, a diffractive lens having a spiral diffraction pattern thereon. As indicated above, spiral launch methods and configurations are known. A known spiral launch method and configuration may be implemented in the optical coupling systems 30 and 40 to cause laser light to be launched into the ends 2A and 2B of the MM optical fiber 2 in a way that causes a plurality of higher order modes to be excited in the MM optical fiber 2. As described above with reference to FIG. 1, excitation of a plurality of modes in the MM optical fiber 2 will ensure that the possibility of near-end and far-end optical coupling of the VCSELs 12, and 22 is prevented or at least reduced.

Another way to achieve an offset launch is to place an optical waveguide that is short in length and that provides a refractive index step function at each of the ends 2A and 2B of the fiber 2. The optical waveguide may be a short length of optical fiber that exhibits a refractive index step function. The laser light that is produced by the VCSELs 12 and 22 is launched by the optical coupling systems 30 and 40 into the ends of the short lengths of optical fibers coupled to the ends 2A and 2B of the MM optical fiber 2. The light that passes out of the short lengths of step index fibers into the ends 2A and 2B of the MM optical fiber 2 will excite a plurality of higher order modes in the fiber 2. The excitation of the higher order modes in the fiber 2 will prevent or at least substantially reduce near-end and far-end optical coupling between the VCSELs 12 and 22. This method may be combined with one or more of the aforementioned offset launch methods to further ensure that a sufficient number of higher order modes are excited in the MM optical fiber 2.

Another way to ensure that a plurality of higher order modes are excited in the MM optical fiber 2 is to use a fiber coupler that is designed to receive light produced by a laser diode and to convert the light into multiple higher order modes. One of the fiber couplers would be connected to each of the ends 2A and 2B of the MM optical fiber 2. The light exiting the couplers and entering the ends 2A and 2B of the MM optical fiber will cause a plurality of higher order modes to be excited in the MM optical fiber.

Yet another way to achieve an offset launch would be to provide a mode scrambler at each of the ends 2A and 2B of the MM optical fiber 2. A mode scrambler is generally a length of optical fiber wrapped around a cylinder. The mode scramblers will receive the light output from the optical coupling systems 30 and 40 and spread the light into higher order modes prior to the light being coupled into the MM optical fiber 2. The respective mode scramblers may be internal to or external to the transceivers 10 and 20.

By using one or more of the aforementioned offset launch methods and configurations for the optical coupling systems 30 and 40, a plurality of higher order modes are excited in the MM optical fiber 2. As indicated above, this feature enables the VCSELs 12 and 22 to emit light of the same wavelength while preventing or at least substantially reducing any near-end or far-end optical coupling between the VCSELs 12 and 22. This, in turn, allows optical data signals of the same wavelength that are produced by the VCSELs 12 and 22 to be bi-directionally communicated over the MM optical fiber 2. If commercially available VCSELs that operate at 10 Gb/s are used for this purpose, the optical link 1 has an aggregate data rate of 20 Gb/s. The phrase "offset launch", as that phrase is used herein, is intended to denote a launch that uses one or more of the aforementioned launch techniques, or one or more other launch techniques not explicitly described herein, to predominantly excite one or more higher order mode groups of the MM optical fiber 2.

Another way to prevent, or at least substantially reduce, optical coupling between the VCSELs 12 and 22 is through the use of a dithering technique that dithers the bias conditions of the VCSELs 12 and 22 to cause their respective wavelengths to be shifted. The use of dithering is well known to persons of ordinary skill in the art. Therefore, a detailed discussion of the manner in which the bias conditions of the VCSELs 12 and 22 may be dithered to prevent, or at least reduce, optical coupling between the VCSELs 12 and 22 will not be provided herein.

Figure 4:
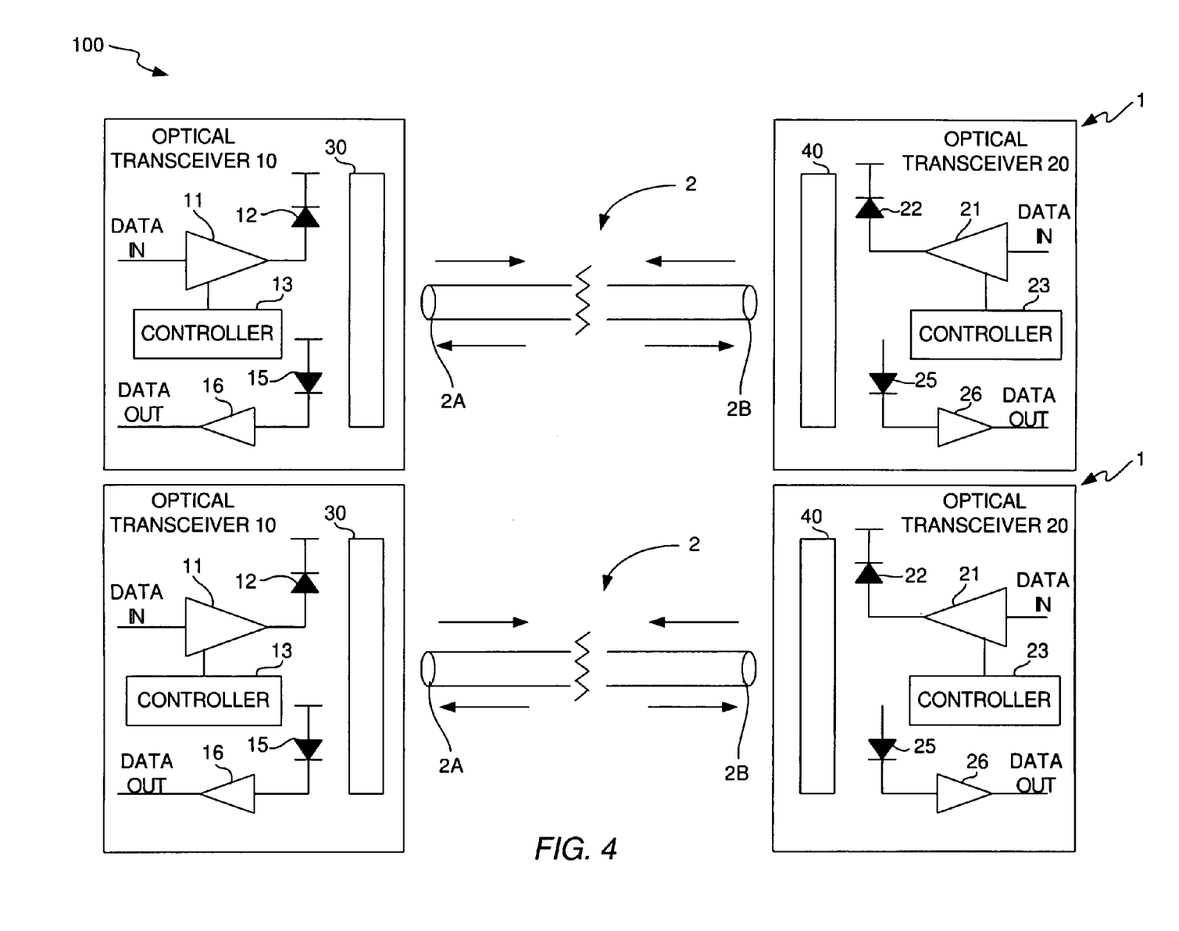
FIG. 4 illustrates a block diagram of a bi-directional duplex optical link in accordance with an embodiment comprising two of the bi-directional optical links shown in FIG. 1.

FIG. 4 illustrates a block diagram of a bi-directional duplex optical link 100 in accordance with an embodiment comprising two of the bi-directional optical links shown in FIG. 1. Because each of the bi-directional optical links 1 shown in FIG. 4 is identical to the bi-directional optical link 1 shown in FIG. 1, the reference numerals that are used in FIG. 4 are identical to the reference numerals that are used in FIG. 1. Each of the bi-directional optical links 1 operates in the manner described above with reference to FIG. 1. Therefore, if the data rate of the VCSELs 12 and 22 is 10 Gb/s, each of the bi-directional links 1 has an aggregate data rate of 20 Gb/s, i.e., 10 Gb/s in each direction. In this case, consequently, the bi directional duplex optical link 100 has an aggregate data rate of 40 Gb/s. It should be noted, however, that the invention is not limited to VCSELs having any particular data rates. The VCSELs 12 and 22 are discussed herein as having a speed of 10 Gb/s simply because VCSELs that are currently commercially available in the industry generally have speeds that do not exceed 10 Gb/s. Of course, as VCSELs are developed that having higher speeds, such VCSELs may be used in the optical transceivers 10 and 20 of the invention to provide the bi-directional optical link 1 with aggregate data rates that exceed 20 Gb/s, and consequently, to provide a bi-directional duplex optical link 100 that has aggregate data rates in excess of 40 Gb/s.

Also, as indicated above, the invention is not limited with respect to the types of lasers that are used in the optical transceivers 10 and 20. Although the invention has been described with reference to using VCSELs as the laser diodes, other laser diodes, such as edge emitting laser diodes, for example, may also be suitable for this purpose. Other modifications may be made to the duplex bi-directional link 100, such as those modifications described above with reference to the bi-directional optical link 1 shown in FIG. 1. For example, additional electrical circuitry (not shown) may be included on the transmit and receive sides of the optical transceivers 10 and 20 for providing additional functionality of the type typically provided in optical transceivers.

Figure 5:
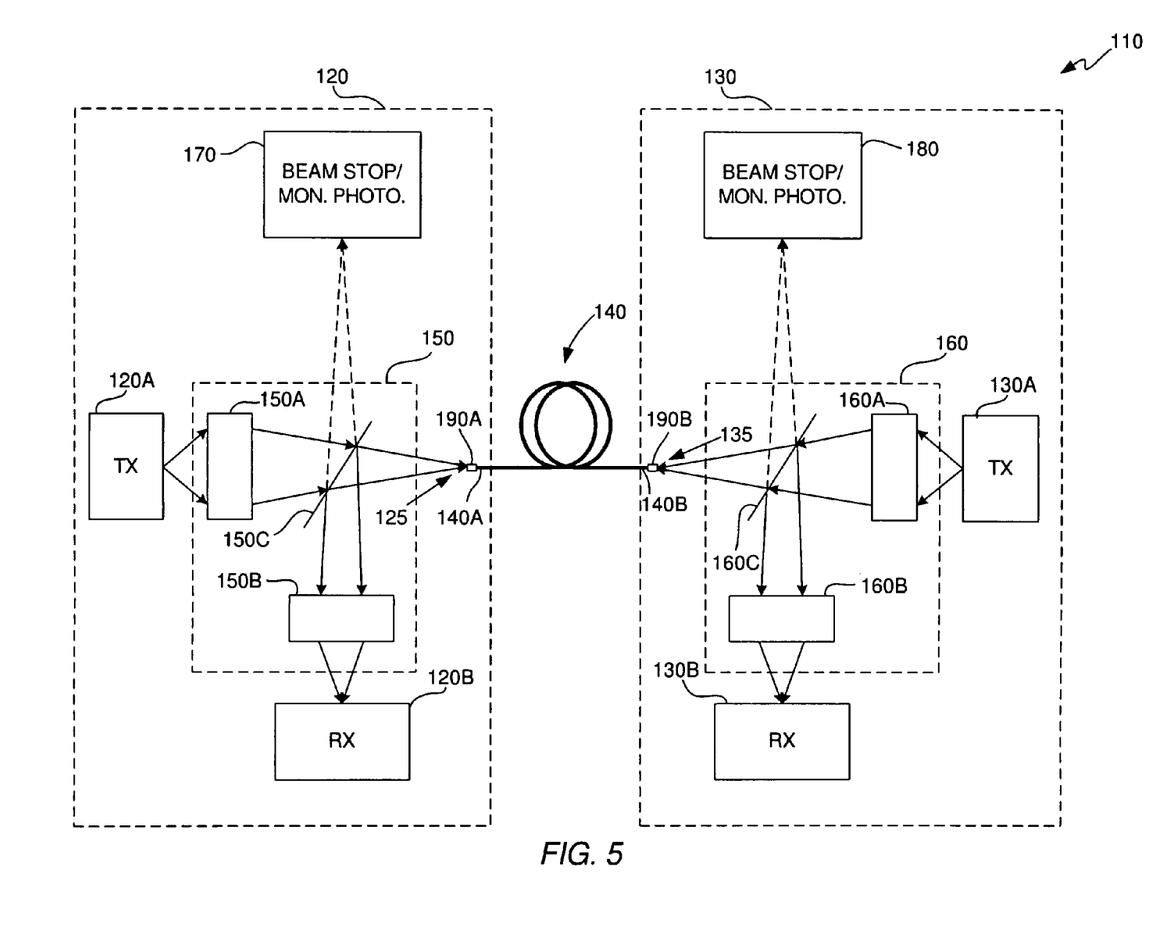
FIG. 5 illustrates another embodiment of the bi-directional optical link in which the optical coupling systems of the optical transceivers have bi-directional optical multiplexer configurations.

FIG. 5 illustrates another embodiment of the bi-directional optical link 110 in which the optical coupling systems 150 and 160 of the optical transceivers 120 and 130, respectively, have bi-directional optical MUX configurations. For ease of illustration, the transmit and receive sides of the optical transceivers 120 and 130 are represented by blocks labeled TX and RX, respectively. The TX block 120A of the optical transceiver 120 typically includes at least the components labeled 11, 12 and 13 shown in FIG. 1. Likewise, the TX block 130A of the optical transceiver 130 typically includes at least the components labeled 21, 22 and 23 shown in FIG. 1. The RX block 120B of the optical transceiver 120 typically includes at least the components labeled 15 and 16 in shown FIG. 1. Likewise, The RX block 130B of the optical transceiver 130 typically includes at least the components labeled 25 and 26 shown in FIG. 1. The optical transceivers 120 and 130 are connected to respective ends 140A and 140B of an MM optical fiber, which is typically an OM3 MM optical fiber. In accordance with this embodiment, the TXs 120A and 130A and the RXs 120B and 130B all operate at the same wavelength. Each of the optical transceivers 120 and 130 may optionally include a beam stop and/or a monitor photodiode 170 and 180.

The bi-directional optical MUX 150 of the optical transceiver 120 includes a TX optical element (e.g., a diffractive lens) 150A, an RX optical element (e.g., a refractive lens) 150B, and an optical beam splitter 150C. Likewise, the bi-directional optical MUX 160 of the optical transceiver 130 includes a TX optical element (e.g., a diffractive lens) 160A, an RX optical element (e.g., a diffractive lens) 160B, and an optical beam splitter 160C. Each of the optical coupling systems 150 and 160 allows the optical transceivers 120 and 130 to simultaneously transmit and receive optical data signals that are at the same wavelength, which may be, for example, 840 nm, 1310 nm or 1550 nm. The invention, however, is not limited with respect to the wavelength that is used for this purpose.

The optical transceivers 120 and 130 operate as follows. In the transmit direction of the optical transceiver 120, the TX 120A produces an optical data signal having wavelength $\lambda 1$, which is received by the TX optical element 150A of the bi-directional optical MUX 150. In accordance with this illustrative embodiment, the TX optical element 150A is spiral lens that encodes the optical data signal with a spiral phase pattern and directs the encoded optical data signal onto a beam splitter 150C. The beam splitter 150C passes a first, relatively small portion of the encoded optical data signal and reflects a second, relatively large portion of the optical data signal. For example, the first portion may have 20% of the optical power of the optical data signal launched by the spiral lens 150A, whereas the second portion may have 80% of the optical power of the optical data signal reflected to the beam stop 170. Whilst this might seem inefficient, a relatively large loss between the laser diode of the TX 120A and the fiber 140 is normally required to enable proper biasing and setup of the laser diode control circuits (not shown). The first portion of the optical data signal passes through the beam splitter 150C and is brought to a focal point at the end 140A of the MM optical fiber 140. The first optical data signal is then transmitted along the MM optical fiber 140 to the optical transceiver 130 coupled to the opposite end 140B of the MM optical fiber 140. The second portion of the optical data signal is directed onto the beam stop and/or monitor photodiode 170. A beam stop merely absorbs the light received thereby to prevent, near-end, stray light from affecting the performance of the optical transceiver 120. A monitor photodiode is often used in a power monitoring feedback loop to monitor the optical output power of the laser diode of the TX.

In accordance with an embodiment, transparent stubs 190A and 190B are placed on the ends 140A and 140B, respectively, of the MM optical fiber 140. The stubs 190A and 190B have first ends that attach to respective optical ports 125 and 135, respectively, of the optical transceivers 120 and 130, respectively. The stubs 190A and 190B have second ends that attach to the ends 140A and 140B, respectively, of the MM optical fiber 140. The ends of the stubs 190A and 190B that attach to the optical ports 125 and 135 have anti-reflection coatings thereon. The ends of the stubs 190A and 190B that have the anti-reflection coatings thereon will be referred to hereinafter as the entrance facets of the stubs 190A and 190B. The ends of the stubs 190A and 190B that attach to the ends 140A and 140B of the MM optical fiber 140 are attached in such a way that no light is reflected at the interfaces of the stubs 190A and 190B and the ends 140A and 140B, respectively, of the MM optical fiber 140. The stubs 190A and 190B essentially eliminate all near-end reflections at the optical ports 125 and 135, thereby preventing signal degradation due to cross-talk that might otherwise be caused by reflections of light at these interfaces. It should also be understood that as part of normal operation of the optical transceivers 120 and 130, the fiber 140 may be attached and detached to and from the respective optical ports 125 and 135, and hence from the respective stubs 190A and 190B. Stubs of the type that may be used as the stubs 190A and 190B are well known in the art. Therefore, persons of ordinary skill in the art will understand, in view of the description provided herein, the manner in which the stubs 190A and 190B may be designed and implemented in the bi-directional optical link 110 shown in FIG. 5.

In the receive direction of the optical transceiver 120, an optical data signal of wavelength λ1 that has been transmitted by the optical transceiver 130 over the MM optical fiber 140 is received by the beam splitter 150C. The beam splitter 150C reflects the received optical data signal onto the lens 150B, which is typically a refractive lens that focuses the optical data signal to a focal point on the photodiode (not shown) of the RX 120B. The stub 190B prevents near-end reflections from occurring in the optical transceiver 130 that might otherwise result in cross-talk and signal degradation.

The operations for the transmit and receive directions of the optical transceiver 130 are identical to the operations described above for the transmit and receive directions of the optical transceiver 120. In the transmit directions of the optical transceivers 120 and 130, the optical data signals are launched with physical and/or angular offsets of the aforementioned types. The physical and/or angular offset launches prevent or at least substantially reduce near-end and/or far-end optical coupling between the respective VCSELs (not shown) of the TXs 120A and 130A. In accordance with the illustrative embodiment of FIG. 5, the offset launch that is used by the optical transceivers 120 and 130 is a spiral offset launch provided by the spiral lenses 150A and 160A of the bi-directional optical MUXes 150 and 160, respectively, of the optical transceivers 120 and 130, respectively. The use of the spiral launch method and configuration prevents, or at least substantially reduces, near-end and/or far-end optical coupling between the respective VCSELs (not shown) of the TXs 120A and 130A. Also, as indicated above with reference to FIG. 1, a dithering technique may be used to dither the bias conditions of the VCSELs of the TXs 120A and 130A to causes their respective wavelengths to be shifted to further reduce optical coupling between the VCSELs.

It should be noted that the stubs 190A and 190B are optional. If the stubs 190A and 190B are not used and no other techniques are used to eliminate near-end reflections, the link 110 may still operate satisfactorily, but there will be a performance penalty in terms of increased signal degradation. The near-end reflection is typically only approximately 4% of the total energy of the optical data signal. Therefore, it is possible to have satisfactory performance without totally eliminating near-end reflection. Another option to using the stubs 190A and 190B is to employ some form of electronic equalization in the RXs 120B and 130B to cancel out the near-end reflection. It is possible to use electronic equalization for this purpose due to the fact that any near-end reflection generally will always occur at the same instant in time relative to the transmission of the optical data signal at the near-end optical transceiver. For example, electronic equalizers (not shown) may be used in the RXs 120B and 130B to perform near-end reflection cancellation. The manner in which electronic equalizers may be used to perform near-end refection cancellation is known to persons of ordinary skill in the art.

Assuming for illustrative purposes that each of the TXs 120A and 130A has a VCSEL or other laser diode that transmits at a data rate of at least 10 Gb/s, and that each of the RXs 120B and 130B has a photodiode (e.g., a P-I-N photodiode) that is capable of detecting optical data signals at a data rate of at least 10 Gb/s, then the aggregate data rate of the bi-directional optical link is at least 20 Gb/s.

Figure 6:
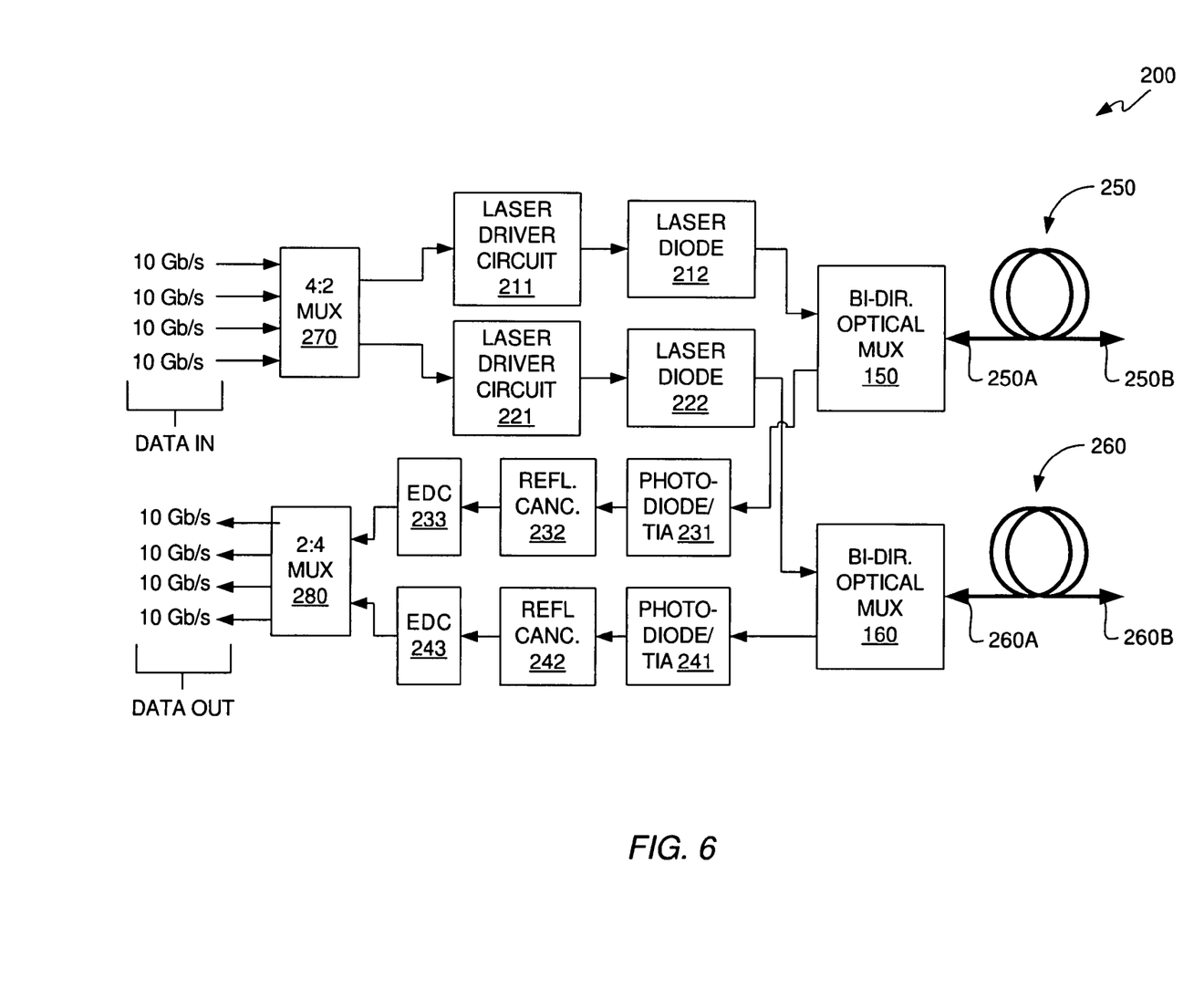
FIG. 6 illustrates a block diagram in accordance with another illustrative embodiment in which the bi-directional optical multiplexers shown in FIG. 5 are used to enable an optical transceiver having an overall data rate of at least 80 Gb/s to be achieved without the need to use four separate sets of parallel optics in the optical transceiver.

FIG. 6 illustrates a block diagram in accordance with another illustrative embodiment in which the bi-directional optical MUXes 150 and 160 shown in FIG. 5 are used to enable an optical transceiver 200 having an aggregate data rate of at least 80 Gb/s to be achieved without the need to use four separate sets of parallel optics in the optical transceiver 200. The optical transceiver 200 is capable of simultaneously transmitting 40 Gb of data per second and receiving 40 Gb of data per second to achieve an aggregate data rate of 80 Gb/s for the bi-directional duplex optical fiber link comprising two MM optical fibers 250 and 260. To accomplish this, the optical transceiver 200 includes two 20 Gb/s transmit channels and two 20 Gb/s receive channels. It should be noted, however, that only two sets of parallel optics, namely, the two optical bi-directional MUXes 150 and 160, are needed.

In accordance with this illustrative embodiment, a first transmit channel of the optical transceiver 200 includes a first laser driver circuit 211 and a first laser diode 212. A second transmit channel of the optical transceiver 200 includes a second laser driver circuit 221 and a second laser diode 222. A first receive channel of the optical transceiver 200 includes a first photodiode and TIA 231, a first reflection cancellation equalizer circuit 232, and a first electronic dispersion compensation (EDC) circuit 233. A second receive channel of the optical transceiver 200 includes a second photodiode and TIA 241, a second reflection cancellation circuit 242, and a second EDC circuit 243. The bi-directional optical MUXes 150 and 160 optically couple optical data signals produced by the first and second laser diodes 212 and 222 into ends 250A and 260A of first and second MM optical fibers 250 and 260, respectively. The bi-directional MUXes 150 and 160 optically couple optical data signals passing out of the ends 250A and 260A of the MM optical fibers 250 and 260, respectively, onto the first and second photodiodes/TIAs 231 and 241, respectively.

On the transmit side of the optical transceiver 200, a 4:2 MUX 270 receives four 10 Gb/s electrical data signals and time division multiplexes (TDM) those four electrical data signals such that two 20 Gb/s electrical data signals are simultaneously provided to the first and second laser driver circuits 211 and 221. The first and second laser driver circuits 211 and 221 provide first and second drive signals to the first and second laser diodes 212 and 222, respectively. The first and second drive signals cause the first and second laser diodes 212 and 222 to produce first and second optical data signals. The first optical data signal is optically coupled by the bi-directional optical MUX 150 into the first end 250A of the MM optical fiber 250. The second optical data signal is optically coupled by the bi-directional optical MUX 160 into the first end 260A of the MM optical fiber 260.

On the receive side of the optical transceiver 200, first and second optical data signals passing out of the ends 250A and 260A of the MM optical fibers 250 and 260, respectively, are optically coupled by the bi-directional optical MUXes 150 and 160 onto the first and second photodiodes/TIAs 231 and 241, respectively. The photodiodes/TIAs 231 and 241 detect the first and second optical data signals and produce corresponding first and second electrical data signals, respectively. The first and second electrical data signals are received by the first and second reflection cancellation circuits 232 and 242, respectively, which electronically cancel near-end reflection out of the first and second electrical data signals, respectively. It should be noted that if the stubs 190A and 190B described above with reference to FIG. 5 are used, the reflection cancellation circuits 232 and 242 are not needed. Also, even if the stubs 190A and 190B are not used, the reflection cancellation circuits are not needed of the resulting performance penalty in terms of signal degradation is deemed to be acceptable.

Assuming the reflection cancellation circuits 232 and 242 are used, the first and second electrical data signals are output from the reflection cancellation circuits 232 and 242 and provided to the EDC circuits 233 and 243, which perform electronic dispersion compensation. The compensated first and second electrical data signals are received by a 2:4 demultiplexer (DEMUX) 280, which performs time division demultiplexing to provide four 10 Gb/s recovered data signals.

The EDC circuits 233 and 243 are useful if relatively slow laser diodes 212 and 222 are used because the EDC circuits 233 and 243 compensate for the relatively slow rise times of the transmitters and for relatively slow electrical receivers. In addition, the EDC circuits 233 and 243 also perform modal dispersion compensation on the first and second electrical data signals. This feature enables an optical link that implements one of the transceivers 200 at each end of the MM optical fibers 250 and 260 to operate at a data rate that is twice the aggregate TX data rate of the laser diodes 212 and 222. For example, assuming that each of the laser diodes 212 and 222 operates at a data rate of 10 Gb/s, but are being driven by the laser driver circuits 211 and 221 at respective data rates of 20 Gb/s (aggregate TX data rate of 40 Gb/s), the use of the EDC circuits 233 and 243 enables the RX side of the transceiver 200 to recover data at a rate of 40 Gb/s (20 Gb/s on each RX channel). Therefore, in this example, the optical transceiver 200 has an aggregate data rate of 80 Gb/s (40 Gb/s in the TX and RX directions). Thus, in this example, an optical link that employs one of the optical transceivers 200 at the ends 250A and 260A of the MM optical fibers 250 and 260 and another of the optical transceivers 200 at the other ends 250B and 260B of the MM optical fibers 250 and 260 will have an aggregate data rate of 80 Gb/s.

A variety of modifications may be made to the optical transceiver 200. For example, although the photodiodes/TIAs 231 and 241 are shown as being combined, the photodiodes and their respective TIAs may separate be components, as described above with reference to FIG. 1. Also, the equalizer circuits 232, 242, the EDC circuits 233 and 243, and the MUX and DEMUX 270 and 280 are optional. In addition, the transmit and receive sides of the optical transceiver 200 may include additional components that are not shown in FIG. 6 for ease of illustration (input buffers, output buffers, filters, amplifiers, monitor photodiodes, control logic, etc.).

If the near-end reflection cancellation circuits 232 and 242 are used, the circuits 232 and 242 may be set to the proper time delay at the time of manufacturing and then left fixed at that time delay over the life of the optical transceiver 210. Alternatively, the time delay of the reflection cancellation circuits 232 and 242 may be set to the proper time delay at the time of manufacturing and left fixed at that time delay, but with the amplitude of the cancellation signal being adaptively varied by control logic (not shown) of the optical transceiver 200 in a way that minimizes, or at least substantially reduces, signal degradation. As yet another alternative, the reflection cancellation circuits 232 and 242 may be fully adaptive circuits that are varied by control logic (not shown) of the optical transceiver 200 such that both the time delay and the amplitude of the cancellation signal may be varied in a way that minimizes signal degradation.

It should be noted that while the embodiments of the invention have been described as not using WDM in order to alleviate the need to use laser diodes that operate at different wavelengths, this does not mean that WDM may not be used with the invention. If suitable WDM components are available, they may be used with the invention to further increase the bandwidth of the optical transceiver and of the optical link. However, even if WDM is used, each duplex channel (i.e., transmit and receive channel) will typically operate at a single wavelength, although different duplex channels may operate at different wavelengths.

The modulation format that is used for modulating the laser diodes shown in FIGS. 1 and 4-6 will typically be non-return-to-zero (NRZ) modulation format. However, other modulation formats may instead be used, including, for example, multi-level encoding formats, carrierless amplitude and phase (CAP) formats, sub-carrier multiplexing (SCM), and analog transmission formats. Also, although the invention has been described with reference to using OM3 MM optical fiber, other types of MM optical fiber or waveguides, including plastic optical fibers or waveguides, may also be used with the invention.

It should be noted that the invention has been described with reference to a few illustrative embodiments for the purpose of demonstrating the principles and concepts of the invention. The invention is not limited to the embodiments described herein, as will be understood by those of ordinary skill in the art in view of the description provided herein. Many modifications may be made to the embodiments described herein without deviating from the goals or objectives of the invention, and all such modifications are within the scope of the invention.

What is claimed is:

1. An optical transceiver for communication over an optical link, the optical transceiver comprising:
at least a first laser driver circuit configured to receive a first electrical data signal and to produce a first electrical drive signal;
at least a first laser diode configured to receive the first electrical drive signal produced by the first laser driver circuit and to produce at least a first optical data signal having a first data rate;
at least a first bi-directional optical multiplexer (MUX) configured to receive the first optical data signal and to launch the first optical data signal into a first end of a first multimode (MM) optical fiber with an offset, the first bi-directional MUX including at least a first optical beam splitter, wherein a first portion of the first optical data signal passes through the optical beam splitter and enters the first end of the first MM optical fiber with the offset, and wherein a second portion of the first optical data signal is directed by the first optical beam splitter in a direction away from the first optical beam splitter and away from the first end of the first MM optical fiber;
at least a first photodiode configured to receive a first received optical data signal that passes out of the first end of the first MM optical fiber, wherein the first received optical data signal is an optical data signal produced by a laser diode of a second optical transceiver connected to a second end of the first MM optical fiber, wherein at least a portion of the first received optical data signal is directed by first optical beam splitter onto the first photodiode, the first received optical data signal having the first data rate, and wherein the first photodiode is configured to convert said at least a portion of the first received optical data signal into a first received electrical data signal; and at least a first amplifier configured to amplify the first received electrical data signal to produce a first amplified received electrical data signal.

2. The optical transceiver of claim 1, wherein the first bi-directional optical MUX further includes at least a first optical element that provides the offset launch, the first optical element being interposed between the first laser diode and the first optical beam splitter, the first optical beam splitter being interposed between the first optical element and the first end of the first MM optical fiber, and wherein the offset launch causes at least one higher order mode group to be excited in the first MM optical fiber.

3. The optical transceiver of claim 2, wherein the offset is one or both of a physical offset and an angular offset.

4. The optical transceiver of claim 1, wherein the first laser diode and the laser diode of the optical transceiver connected to the second end of the MM optical fiber are vertical surface emitting laser diodes (VCSELs).

5. The optical transceiver of claim 1, wherein launching the first optical data signal with the offset prevents or at least substantially reduces near-end and far-end optical coupling between the first and second laser diodes.

6. The optical transceiver of claim 1, further comprising:
at least a second laser driver circuit configured to receive a second electrical data signal and to produce a second electrical drive signal;
at least a second laser diode configured to receive the second electrical drive signal produced by the second laser driver circuit and to produce at least a second optical data signal having the first data rate;
at least a second bi-directional optical MUX configured to receive the second optical data signal and to launch the second optical data signal into the first end of a second MM optical fiber with an offset, the second bi-directional MUX including at least a second optical beam splitter, wherein a first portion of the second optical data signal passes through the second optical beam splitter and enters the first end of the second MM optical fiber with the offset, and wherein a second portion of the second optical data signal is directed by the second optical beam splitter in a direction away from the second optical beam splitter and away from the first end of the second MM optical fiber;
at least a second photodiode configured to receive a second received optical data signal that passes out of the first end of the second MM optical fiber, wherein the second received optical data signal is an optical data signal produced by a laser diode of an optical transceiver connected to a second end of the second MM optical fiber, wherein the second optical beam splitter directs at least a portion of the second received optical data signal onto the second photodiode, the second received optical data signal having the first data rate, the second photodiode converting said at least a portion of the second received optical data signal into a second received electrical data signal; and at least a first amplifier configured to amplify the second received electrical data signal to produce a second amplified received electrical data signal.

7. The optical transceiver of claim 6, wherein the second bi-directional optical MUX further includes at least a first optical element that provides the offset launch of the second optical data signal, and wherein the offset launch of the second optical data signal into the first end of the second MM optical fiber causes at least one higher order mode group to be excited in the second MM optical fiber.

8. The optical transceiver of claim 7, wherein the offset of the second optical data signal is one or both of a physical offset and an angular offset.

9. The optical transceiver of claim 6, wherein the second bi-directional optical MUX further includes at least a second optical element that launches the second optical data signal into the first end of the second MM optical fiber.

10. The optical transceiver of claim 9, wherein the second bi-directional optical MUX further includes at least a second optical element that launches the second optical data signal into the first end of a second MM optical fiber with the offset, the second optical beam splitter being interposed between the second optical element and the first end of the second MM optical fiber, wherein a first portion of the second optical data signal passes through the second optical beam splitter and enters the first end of the second MM optical fiber, and wherein a second portion of the second optical data signal is directed by the second optical beam splitter in a direction away from the second optical beam splitter and away from the first end of the second MM optical fiber.

11. The optical transceiver of claim 10, wherein the second bi-directional optical MUX further includes a third optical element, and wherein the second received optical data signal that passes out of the first end of the second MM optical fiber impinges on the second optical beam splitter, and wherein a first portion of the second received optical data signal is directed by the second optical beam splitter in a direction toward the third optical element of the second bi-directional optical MUX, and wherein the third optical element of the second bi-directional optical MUX is configured to direct the first portion of the second received optical data signal onto the second photodiode.

12. The optical transceiver of claim 6, wherein the optical transceiver simultaneously transmits and receives the first optical data signal and the first received optical data signal, respectively, at an aggregate data rate of at least 20 gigabits per second (Gb/s), and wherein the optical transceiver simultaneously transmits and receives the second optical data signal and the second received optical data signal, respectively, at an aggregate data rate of at least 20 Gb/s, and wherein the optical transceiver has an aggregate data rate for transmitting the first and second optical data signals and receiving the first and second received optical data signals of at least 40 Gb/s.

13. The optical transceiver of claim 6, further comprising:
first and second electronic dispersion compensation (EDC) circuits electrically coupled to the first and second amplifiers, the first and second EDC circuits receiving the first and second amplified received electrical data signals, respectively, and performing EDC on the first and second amplified received electrical data signals to produce first and second compensated electrical data signals; and
wherein the optical transceiver simultaneously transmits and receives the first optical data signal and the first received optical data signal, respectively, at an aggregate data rate of at least 40 gigabits per second (Gb/s), and wherein the optical transceiver simultaneously transmits and receives the second optical data signal and the second received optical data signal, respectively, at an aggregate data rate of at least 40 Gb/s, and wherein the optical transceiver has an aggregate data rate for transmitting the first and second optical data signals and receiving the first and second received optical data signals of at least 80 Gb/s.

14. The optical transceiver of claim 6, wherein the second laser diode and the laser diode of the optical transceiver connected to the second end of the second MM optical fiber are vertical surface emitting laser diodes (VCSELs).

15. The optical transceiver of claim 6, wherein launching the second optical data signal with the offset prevents or at least substantially reduces near-end and far-end optical coupling between the first laser diode and the laser diode of the optical transceiver connected to the second end of the second MM optical fiber.

16. A bi-directional duplex optical link comprising:
at least first and second multimode (MM) optical fibers, each of the MM optical fibers having a first end and a second end; and
at least first, second, third, and fourth optical transceivers, the first and second optical transceivers being connected to the first and second ends of the first MM optical fiber, the third and fourth optical transceivers being connected to the first and second ends of the second MM optical fiber, each optical transceiver comprising:
an optical transmitter (TX) comprising at least a laser driver circuit and a laser diode, the laser driver circuit being configured to receive an electrical data signal and to produce an electrical drive signal based on the electrical data signal, the laser diode being configured to receive the electrical drive signal and to produce a TX optical data signal having a first data rate;
an optical receiver (RX) comprising at least a photodiode and an amplifier, the photodiode being configured to receive an RX optical data signal and to produce a corresponding RX electrical data signal based on the RX optical data signal, the RX optical data signal having the first data rate, the amplifier being configured to amplify the RX electrical data signal to produce an amplified RX electrical data signal; and
a bi-directional optical multiplexer (MUX) configured to perform an offset launch of the TX optical data signal into the first end of one of the first and second MM optical fibers, the bi-directional optical MUX including at least an optical beam splitter, the optical beam splitter being configured to optically couple at least a portion of the TX optical data signal into the first end of one of the first and second MM optical fibers and to optically couple at least a portion of the RX optical data signal passing out of the first end of one of the first and second MM optical fibers onto the photodiode.

17. The bi-directional duplex optical link of claim 16, wherein each bi-directional optical MUX further includes at least a first optical element that provides the offset launch of at least a portion of the respective TX optical data signal into the first end of one of the first and second MM optical fibers, and wherein the offset launch causes at least one higher order mode group to be excited in whichever one of the first or second MM optical fibers the portion of the respective TX optical data signal is launched into by said at least a first optical element.

18. The bi-directional duplex optical link of claim 17, wherein the offset launch is one or both of a physical offset and an angular offset.

19. The bi-directional duplex optical link of claim 16, wherein the first data rate is equal to or greater than approximately 10 gigabits per second (Gb/s).

20. The bi-directional duplex optical link of claim 16, wherein each bi-directional optical MUX includes at least a respective spiral optical element that launches the respective TX optical data signal into the first end of the respective one of the first or second MM optical fiber.

21. The bi-directional duplex optical link of claim 16, wherein each optical RX further comprises:
an electronic dispersion compensation (EDC) circuit electrically coupled to the respective amplifier of the optical RX, the respective EDC circuit receiving the respective RX amplified received electrical data signal and performing EDC on the respective amplified received electrical data signals to produce a compensated electrical data signal; and
wherein each optical transceiver simultaneously transmits and receives the respective TX optical data signal and the respective RX received optical data signal, respectively, at an aggregate data rate of at least 40 gigabits per second (Gb/s) such that the bi-directional duplex optical link has an aggregate data rate of at least 80 Gb/s for transmitting the TX optical data signals and receiving the RX received optical data signals.

22. The bi-directional duplex optical link of claim 16, wherein the laser diodes of the optical transceivers are vertical surface emitting laser diodes (VCSELs).

23. The bi-directional duplex optical link of claim 16, wherein launching the TX optical data signals with an offset prevents or at least substantially reduces near-end and far-end optical coupling between the laser diodes of the first and second optical transceivers and between the laser diodes of the third and fourth optical transceivers.

24. A method for communicating optical data signals over a bi-directional duplex optical link, the method comprising:
providing at least first and second multimode (MM) optical fibers, each of the MM optical fibers having a first end and a second end;
providing at least first, second, third, and fourth optical transceivers, the first and second optical transceivers being connected to the first and second ends of the first MM optical fiber, the third and fourth optical transceivers being coupled to the first and second ends of the second MM optical fiber; and
in each optical transceiver:
receiving a respective electrical data signal in a respective optical transmitter (TX) of the respective optical transceiver, each respective optical TX including at least a respective laser driver circuit and a respective laser diode;
in the respective laser driver circuit, receiving the respective electrical data signal and producing a respective electrical drive signal;
in each respective laser diode, receiving the respective electrical drive signal and producing a respective TX optical data signal having a first data rate;
in a respective bi-directional optical multiplexer (MUX) of the respective optical transceiver, using an offset launch technique to optically coupling at least a portion of the respective TX optical data signal into the first end of one of the first and second MM optical fibers with an offset, the respective bi-directional optical MUX including at least a respective optical beam splitter that directs said portion of the respective TX optical data signal into the first end of one of the first and second MM optical fibers with the offset;

with the respective optical beam splitter of the respective bi-directional optical MUX of the respective optical transceiver, optically coupling at least a portion of a received (RX) optical data signal passing out of the first end of one of the first and second MM optical fibers onto a respective photodiode of a respective optical receiver (RX) of the respective optical TX, wherein the respective photodiode converts the respective RX optical data signal into a corresponding RX electrical data signal, wherein each respective the RX optical data signal has the first data rate; and in a respective amplifier of the respective optical RX of the respective optical transceiver, amplifying the respective RX electrical data signal to produce a respective amplified RX electrical data signal.

25. The method of claim 24, wherein the laser diodes of the optical transceivers are vertical surface emitting laser diodes (VCSELs).

26. The method of claim 24, wherein the TX optical data signals are launched with at least one of a physical and an angular offset, and wherein launching the TX optical data signals with at least one of a physical and an angular offset prevents or at least substantially reduces near-end and far-end optical coupling between the laser diodes of the first and second optical transceivers and between the laser diodes of the third and fourth optical transceivers.

27. The method of claim 24, further comprising:
in each optical RX of each respective optical transceiver, receiving the respective amplified RX electrical data signals and performing electronic dispersion compensation to produce a respective compensated RX electrical data signal, wherein the first data rate is at least 20 gigabits per second (Gb/s), and wherein each of the optical transceivers simultaneously transmits and receives the respective TX optical data signal and the respective RX optical data signal, respectively, at the first data rate of at least 20 Gb/s such that the bi-directional duplex optical link has an aggregate data rate for transmitting and receiving the optical data signals of at least 80 Gb/s.

28. An optical transceiver for communication over an optical link, the optical transceiver comprising:
at least a first laser driver circuit configured to receive a first electrical data signal and to produce a first electrical drive signal;
at least a first laser diode configured to receive the first electrical drive signal produced by the first laser driver circuit and to produce at least a first optical data signal having a first data rate;
at least a first bi-directional optical multiplexer (MUX) configured to receive the first optical data signal and to launch the first optical data signal into a first end of a first multimode (MM) optical fiber with an offset, wherein the first bi-directional optical MUX includes at least a first spiral optical element that launches the first optical data signal into the first end of the first MM optical fiber;
at least a first photodiode configured to receive a first received optical data signal that passes out of the first end of the first MM optical fiber, wherein the first received optical data signal is an optical data signal produced by a laser diode of a second optical transceiver connected to a second end of the first MM optical fiber, wherein the first bi-directional optical MUX directs the first received optical data signal onto the first photodiode, the first received optical data signal having the first data rate, and wherein the first photodiode is configured to convert the first received optical data signal into a first received electrical data signal; and
at least a first amplifier configured to amplify the first received electrical data signal to produce a first amplified received electrical data signal.

29. The optical transceiver of claim 28, wherein the first bi-directional optical MUX further includes at least a first optical beam splitter interposed between said at least one spiral optical element and the first end of the first MM optical fiber, wherein the first optical data signal launched by the first spiral optical element impinges on a first surface of the first optical beam splitter, and wherein a first portion of the first optical data signal passes through the optical beam splitter and enters the first end of the first MM optical fiber, and wherein a second portion of the first optical data signal is reflected by the first surface of the first optical beam splitter in a direction away from the first spiral lens and away from the first end of the first MM optical fiber.

30. The optical transceiver of claim 29, wherein the first received optical data signal that passes out of the first end of the first MM optical fiber impinges on a second surface of the first optical beam splitter, and wherein a first portion of the first received optical data signal is reflected by the second surface of the first optical beam splitter in a direction toward at least a second optical element of the first bi-directional optical MUX, and wherein the second optical element of the first bi-directional optical MUX is configured to direct the first portion of the first received optical data signal onto the first photodiode.

31. A bi-directional duplex optical link comprising:
at least first and second multimode (MM) optical fibers, each of the MM optical fibers having a first end and a second end; and
at least first, second, third, and fourth optical transceivers, the first and second optical transceivers being connected to the first and second ends of the first MM optical fiber, the third and fourth optical transceivers being connected to the first and second ends of the second MM optical fiber, each optical transceiver comprising:
an optical transmitter (TX) comprising at least a laser driver circuit and a laser diode, the laser driver circuit being configured to receive an electrical data signal and to produce an electrical drive signal based on the electrical data signal, the laser diode being configured to receive the electrical drive signal and to produce a TX optical data signal having a first data rate;
an optical receiver (RX) comprising at least a photodiode and an amplifier, the photodiode being configured to receive an RX optical data signal and to produce a corresponding RX electrical data signal based on the RX optical data signal, the RX optical data signal having the first data rate, the amplifier being configured to amplify the RX electrical data signal to produce an amplified RX electrical data signal; and
a bi-directional optical multiplexer (MUX), the bi-directional optical MUX being configured to optically couple at least a portion of the TX optical data signal into the first end of one of the first and second MM optical fibers and to optically couple at least a portion of the RX optical data signal passing out of the first end of one of the first and second MM optical fibers onto the photodiode, wherein each bi-directional optical MUX includes at least a respective spiral optical element that launches the respective TX optical data signal into the first end of the respective one of the first or second MM optical fiber, and wherein the bi-directional optical MUX optically couples said at least a portion of the TX optical data signal into the first end of one of the first and second MM optical fibers using an offset launch.

32. The bi-directional duplex optical link of claim 31, wherein each bi-directional optical MUX further includes a respective optical beam splitter interposed between the respective spiral optical element and the first end of the respective on of the first and second MM optical fibers, wherein the respective TX optical data signal launched by the respective spiral optical element impinges on a first surface of the respective optical beam splitter, and wherein a first portion of the respective TX optical data signal passes through the respective optical beam splitter and enters the first end of the respective one of the first and second MM optical fibers, and wherein a second portion of the respective TX optical data signal is reflected by the first surface of the respective optical beam splitter in a direction away from the respective spiral lens and away from the first end of the respective one of the first and second MM optical fibers.

33. The bi-directional duplex optical link of claim 32, wherein the respective RX optical data signals received by the respective photodiodes of the respective optical RXs are optical data signals that have passed out of the first end of one of the first and second MM optical fibers and impinged on a second surface of a respective one of the optical beam splitters, and wherein a first portion of the respective RX optical data signal is reflected by the second surface of the respective optical beam splitter in a direction toward at least a second optical element of the respective bi-directional optical MUX, and wherein the second optical element of the respective bi-directional optical MUX is configured to direct the first portion of the respective RX optical data signal onto the respective photodiode.

34. A method for communicating optical data signals over a bi-directional duplex optical link, the method comprising:
providing at least first and second multimode (MM) optical fibers, each of the MM optical fibers having a first end and a second end;
providing at least first, second, third, and fourth optical transceivers, the first and second optical transceivers being connected to the first and second ends of the first MM optical fiber, the third and fourth optical transceivers being coupled to the first and second ends of the second MM optical fiber; and
in each optical transceiver:
receiving a respective electrical data signal in a respective optical transmitter (TX) of the respective optical transceiver, each respective optical TX including at least a respective laser driver circuit and a respective laser diode;
in the respective laser driver circuit, receiving the respective electrical data signal and producing a respective electrical drive signal;
in each respective laser diode, receiving the respective electrical drive signal and producing a respective TX optical data signal having a first data rate;
in a respective bi-directional optical multiplexer (MUX) of the respective optical transceiver, using an offset launch technique to optically coupling at least a portion of the respective TX optical data signal into the first end of one of the first and second MM optical fibers with an offset;
in the respective bi-directional optical multiplexer (MUX) of the respective optical transceiver, optically coupling at least a portion of a received (RX) optical data signal passing out of the first end of one of the first and second MM optical fibers onto a respective photodiode of a respective optical receiver (RX) of the respective optical TX, wherein the respective photodiode converts the respective RX optical data signal into a corresponding RX electrical data signal, wherein each respective the RX optical data signal has the first data rate, wherein each bi-directional optical MUX includes at least a respective spiral optical element that launches the respective TX optical data signal into the first end of the respective one of the first or second MM optical fiber; and
in a respective amplifier of the respective optical RX of the respective optical transceiver, amplifying the respective RX electrical data signal to produce a respective amplified RX electrical data signal.

35. The method of claim 34, wherein each bi-directional optical MUX further includes a respective optical beam splitter interposed between the respective spiral optical element and the first end of the respective on of the first and second MM optical fibers, wherein the respective TX optical data signal launched by the respective spiral optical element impinges on a first surface of the respective optical beam splitter, and wherein a first portion of the respective TX optical data signal passes through the respective optical beam splitter and enters the first end of the respective one of the first and second MM optical fibers, and wherein a second portion of the respective TX optical data signal is reflected by the first surface of the respective optical beam splitter in a direction away from the respective spiral lens and away from the first end of the respective one of the first and second MM optical fibers.

36. The method of claim 35, wherein the respective RX optical data signals received by the respective photodiodes of the respective optical RXs are optical data signals that have passed out of the first end of one of the first and second MM optical fibers and impinged on a second surface of a respective one of the optical beam splitters, and wherein a first portion of the respective RX optical data signal is reflected by the second surface of the respective optical beam splitter in a direction toward at least a second optical element of the respective bi-directional optical MUX, and wherein the second optical element of the respective bi-directional optical MUX is configured to direct the first portion of the respective RX optical data signal onto the respective photodiode.

* * * * *